(12) United States Patent  (10) Patent No.: US 8,741,479 B2
Kang et al.  (45) Date of Patent: Jun. 3, 2014

(54) ELECTROLYTE FOR LITHIUM SECONDARY BATTERY AND LITHIUM SECONDARY BATTERY INCLUDING THE SAME

(75) Inventors: Yoon-sok Kang, Seongnam-si (KR); Jun-young Mun, Seoul (KR); Min-sik Park, Suwon-si (KR); Jin-hwan Park, Seoul (KR); Mi-jeong Song, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 28 days.

(21) Appl. No.: 13/432,358

(22) Filed: Mar. 28, 2012

(65) Prior Publication Data

US 2012/0251892 A1    Oct. 4, 2012

(30) Foreign Application Priority Data

Mar. 30, 2011  (KR) ........................ 10-2011-0029036

(51) Int. Cl.
*H01M 6/04*       (2006.01)
*H01M 10/0567*    (2010.01)
*H01M 10/056*     (2010.01)
*H01M 10/0525*    (2010.01)
*H01M 4/131*      (2010.01)
*H01M 10/052*     (2010.01)

(52) U.S. Cl.
CPC ........ *H01M 10/0567* (2013.01); *H01M 10/056* (2013.01); *H01M 10/0525* (2013.01); *H01M 4/131* (2013.01); *H01M 10/052* (2013.01); *Y02E 60/122* (2013.01)
USPC ........... 429/188; 429/310; 429/324; 429/326; 429/341; 429/231.2; 429/231.95

(58) Field of Classification Search
CPC .......... H01M 10/052; H01M 10/0525; H01M 10/0567; H01M 4/131; Y02E 60/122
USPC .............. 429/188, 310, 324, 326, 341, 231.2, 429/231.95
See application file for complete search history.

(56) References Cited

U.S. PATENT DOCUMENTS

| 5,731,106 A | 3/1998 | Tsutsumi et al. |
| 2003/0059684 A1* | 3/2003 | Takami et al. ................. 429/326 |
| 2003/0073006 A1* | 4/2003 | Fujinami et al. .............. 429/336 |
| 2003/0082453 A1* | 5/2003 | Numata et al. ........... 429/231.95 |

(Continued)

FOREIGN PATENT DOCUMENTS

| CN | 1263362 A | 8/2000 | |
| JP | 2002-305022 | * 10/2002 | ............ H01M 10/40 |

(Continued)

OTHER PUBLICATIONS

Glantzounis, et al., Uric Acid and Oxidative Stress, Current Pharmaceutical Design, 2005, vol. 11, No. 32, pp. 4145-4151.

*Primary Examiner* — Patrick Ryan
*Assistant Examiner* — Ben Lewis
(74) *Attorney, Agent, or Firm* — Cantor Colburn LLP

(57) ABSTRACT

An electrolyte for a lithium secondary battery including a lithium salt, a nonaqueous organic solvent, and an additive, in which the additive is composed of one or more compounds including a purinone or a purinone derivative. The lithium secondary battery with improved life and high-temperature storage may be provided by using the electrolyte for a lithium secondary battery according to an embodiment of the present invention.

19 Claims, 5 Drawing Sheets

(56) References Cited

U.S. PATENT DOCUMENTS

2005/0019670 A1    1/2005    Amine et al.
2006/0210883 A1    9/2006    Chen et al.
2008/0318136 A1    12/2008    Amine et al.

FOREIGN PATENT DOCUMENTS

| JP | 2003-115324 A | 4/2003 |
| JP | 2003155288 A | 5/2003 |
| JP | 3959774 B2 | 5/2007 |

* cited by examiner

ELECTROLYTE FOR LITHIUM SECONDARY BATTERY AND LITHIUM SECONDARY BATTERY INCLUDING THE SAME

CROSS-REFERENCE TO RELATED APPLICATIONS

This application claims the benefit of Korean Application No. 10-2011-0029036, filed Mar. 30, 2011 in the Korean Intellectual Property Office, the disclosure of which is incorporated herein by reference.

BACKGROUND

1. Field

Aspects of the present invention relate to an electrolyte for a lithium secondary battery and a lithium secondary battery including the same, and more particularly, to an electrolyte for a lithium secondary battery capable of improving battery life and high-temperature storage characteristics, as well as a lithium secondary battery including the same.

2. Description of the Related Art

Lithium-ion batteries (LIBs) have been developed and used with a focus on small electronic devices and portable information technology (IT) devices because of their high energy density per unit weight and ease of design. Recently, according to developments in electric vehicle power sources and alternative energies, medium and large sized lithium ion batteries are highly anticipated to also be used as power storage sources capable of storing produced electricity.

A lithium secondary battery is composed of a cathode, an anode, an electrolyte, and a separator. During discharging, an oxidation reaction occurs at the anode due to extraction of lithium ions and a reduction reaction occurs at the cathode due to insertion of lithium ions. During charging, an oxidation reaction occurs at the cathode due to extraction of lithium ions and a reduction reaction occurs at the anode due to insertion of lithium ions. The electrolyte does not exhibit electron conductivity and only exhibits ion conductivity, and functions to transfer lithium ions between the cathode and the anode.

Lithium ions inserted into an electrode in the battery may achieve charge neutrality with electrons moved into the electrode and thus are a medium for storing electric energy in the electrode. Therefore, the amount of ions inserted into an electrode for achieving charge neutrality determines the amount of electric energy storable in the battery. Although basic performance characteristics, such as operating voltage and energy density of the lithium secondary battery, are determined by materials constituting the cathode and the anode, it is necessary for the electrolyte to have high ionic conductivity, electrochemical stability, and thermal stability in order to obtain excellent battery performances.

A lithium salt and an organic solvent are used as components of the electrolyte. In consideration of the reduction reaction with the anode and the oxidation reaction with the cathode, the electrolyte has to be electrochemically stable in each corresponding electric potential region.

Meanwhile, electrode active materials for high voltages are being used as the field of lithium secondary batteries is expanded to the fields of electric vehicles and electric power storage. Since an anode active material with low electric potential and a cathode active material with high electric potential are used for the cathode and anode electrodes, the potential window of the electrolyte is narrower than those of the active materials. Thus, the electrolyte is exposed to an environment in which the electrolyte is easily decomposed on surfaces of the cathode and anode electrodes. Also, the lithium secondary battery, when used in an electric vehicle or an electric power storage device, is easily externally exposed to a high-temperature environment, and the temperature of the battery may increase due to instantaneous charge and discharge. Therefore, life of the battery is reduced and the amount of storable energy may be decreased in the high-temperature environment.

Research has been conducted to prevent oxidation of an electrolyte caused by an electrode active material, by forming a thin protective layer on an electrode surface, as one of various research areas related to finding a battery material capable of exhibiting high energy storage and long life in high voltage and high-temperature environments.

With a graphite anode it has been known that a solid electrolyte interphase is formed on the surface of an anode active material during initial charging when an appropriate electrolyte, or an appropriate electrolyte additive, is used, and the solid electrolyte interphase prevents direct contact between the electrolyte and the anode active material to prevent decomposition of the electrolyte. On the other hand, with respect to a cathode, an electrolyte additive is known as an overcharge inhibitor that stops battery operation by forming on a surface of the cathode a thick solid electrolyte interphase to prevent penetration of lithium ions when the cell voltage is increased above a specified voltage.

A cathode solid electrolyte interphase is becoming increasingly necessary as cathode active materials are operated at increasingly high voltages. Research results have reported that when the concentration of an additive used as an overcharge inhibitor is greatly reduced, a thin solid electrolyte interphase is formed on a cathode surface, thus enabling improvement of battery life. However, since the solid electrolyte interphase is nonpolar, penetration of lithium ions is not easy. Therefore, the solid electrolyte interphase will adversely affect battery characteristics.

SUMMARY

Aspects of the present invention provide an electrolyte for a lithium secondary battery capable of preventing oxidation of the electrolyte on a cathode surface and decomposition of the electrolyte under a high-temperature condition.

Aspects of the present invention provide a lithium secondary battery having excellent life and high temperature storage characteristics by preventing oxidation and decomposition of an electrolyte.

According to an aspect of the present invention, an electrolyte for a lithium secondary battery includes: a lithium salt; a nonaqueous organic solvent; and an additive containing one or more compounds comprising a purinone or a purinone derivative.

The additive may have one or more substituents of an alkyl group, an alkoxy group, an alkylene oxide group, an alkylthio group, an ether group, an ester group, a hydroxy group, an amine group, a thiol group, a ketone group, an epoxy group, a fluoro group, a chloro group, or a bromo group.

The purinone or the purinone derivative may include xanthine, hypoxanthine, uric acid, 1,7-dimethylxanthine (paraxanthine), 3,7-dimethylxanthine (theobromine), caffeine, guanine, or isoguanine.

The lithium salt may include $LiPF_6$, $LiBF_4$, $LiSbF_6$, $LiAsF_6$, $LiCF_3SO_3$, $Li(CF_3SO_2)_3C$, $Li(CF_3SO_2)_2N$, $LiC_4F_9SO_3$, $LiClO_4$, $LiAlO_2$, $LiAlCl_4$, $LiBPh_4$, $LiN(C_xF_{2x+1}SO_2)(C_yF_{2y+1}SO_2)$ (where, x and y are natural numbers), $LiCl$, $LiI$, lithium bis(oxalate)borate (LiBOB), or a combination thereof.

The nonaqueous organic solvent may be a carbonate-based solvent, an ester-based solvent, an ether-based solvent, a ketone-based solvent, an alcohol-based solvent, an aprotic solvent, or a combination thereof.

According to another aspect of the present invention, a lithium secondary battery includes: a cathode having a cathode active material capable of inserting and extracting lithium; an anode having an anode active material capable of inserting and extracting lithium; and an electrolyte filling between the cathode and the anode. The electrolyte may include a lithium salt, a nonaqueous organic solvent, and an additive containing one or more compounds comprising a purinone or a purinone derivative.

The cathode may include a solid electrolyte interphase formed on a surface thereof, and the solid electrolyte interphase may be derived from a portion or all of the additive in the electrolyte.

The thickness of the solid electrolyte interphase may be in a range of about 0.05 nm to about 100 nm.

The cathode active material may include $LiCoO_2$, $LiNi_{1-x}Co_xO_2$ ($0 \le x < 1$), $Li_{1-x}M_xO_2$ (where M is Mn or Fe, $0.03 < x < 0.1$), $Li[Ni_xCo_{1-2x}Mn_x]O_2$ ($0 < x < 0.5$), $Li[Ni_xMn_x]O_2$ ($0 < x \le 0.5$), $Li_{1+x}(Ni,Co,Mn)_{1-y}O_z$ ($0 < x \le 1, 0 \le y < 1, 2 \le z \le 4$) $LiM_2O_4$ (where M is Ti, V, or Mn), $LiM_xMn_{2-x}O_4$ (where M is a transition metal, $0 < x < 1$), $LiFePO_4$, $LiMPO_4$ (where M is Mn, Co, or Ni), $V_2O_5$, $V_2O_3$, $VO_2(B)$, $V_6O_{13}$, $V_4O_9$, $V_3O_7$, $Ag_2V_4O_{11}$, $AgVO_3$, $LiV_3O_5$, $\delta-MN_yV_2O_5$, $\delta-NH_4V_4O_{10}$, $Mn_{0.8}V_7O_{16}$, $LiV_3O_8$, $Cu_xV_2O_5$, $Cr_xV_6O_{13}$, $M_2(XO_4)_3$ (where M is a transition metal, and X is S, P, As, Mo, or W), or $Li_3M_2(PO_4)_3$ (where M is Fe, V, or Ti).

The anode active material may include vanadium oxide, lithium vanadium oxide, Si, $SiO_x$ ($0 < x < 2$), Si-T alloy (where, the T includes Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof), graphite, soft carbon, hard carbon, mesophase pitch carbide, or fired cokes.

The lithium secondary battery may further include a separator disposed between the cathode and the anode to electrically insulate the cathode and the anode.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Figure 1:
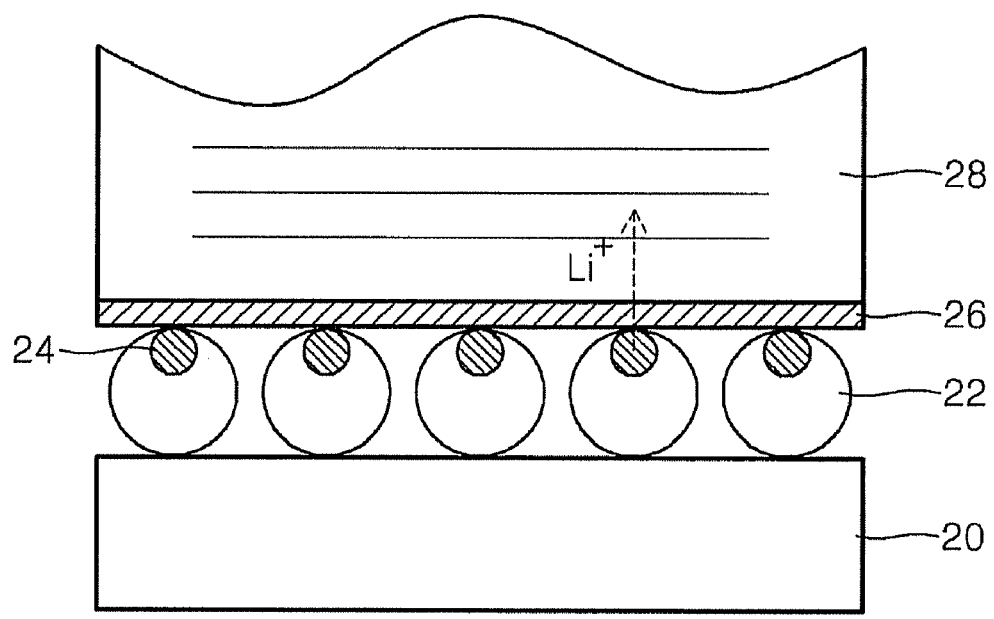
FIG. 1 is a cross-sectional view schematically illustrating a solid electrolyte interphase formed on a cathode surface of a lithium secondary battery according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

According to an embodiment of the present invention, an electrolyte for a lithium secondary battery including a lithium salt, a nonaqueous organic solvent, and an additive is provided, in which the additive includes one or more compounds selected from a purinone or a purinone derivative.

The purinone is a compound in which one or more ketone groups are introduced in a purine ring, and the purine derivative is a compound in which a substituent is introduced in the purinone. The purinone and the purinone derivative are materials that may be used as an antioxidant. Examples of the purinone may include xanthine, hypoxanthine, or uric acid. Examples of the purinone derivatives may include 1,7-dimethylxanthine (paraxanthine), 3,7-dimethylxanthine (theobromine), caffeine, guanine, or isoguanine. Structural formulas of the purinone and the purinone derivative are presented below.

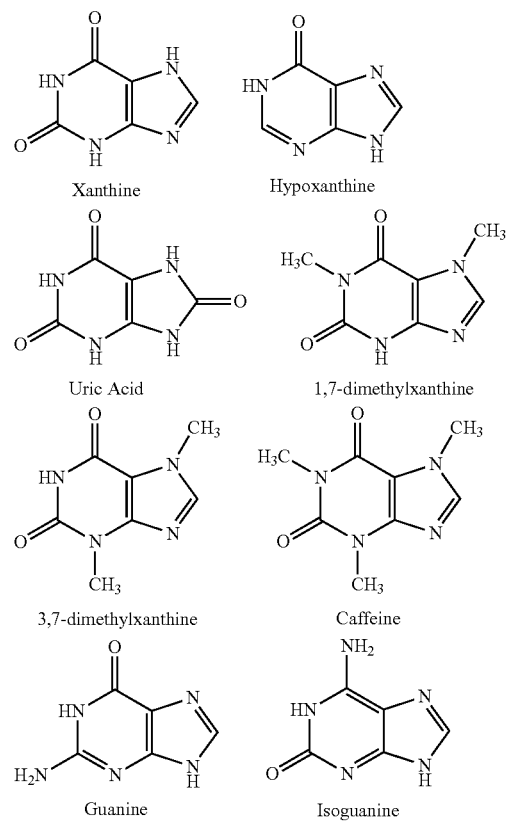

Meanwhile, the foregoing compounds may have one or more substituents of an alkyl group, an alkoxy group, an alkylene oxide group, an alkylthio group, an ether group, an ester group, a hydroxy group, an amine group, a thiol group, a ketone group, an epoxy group, a fluoro group, a chloro group, or a bromo group.

Herein, the alkyl group may be a substituted or unsubstituted $C_1$-$C_{20}$ alkyl group, and particular examples may include methyl, ethyl, propyl, isobutyl, sec-butyl, tert-butyl, neo-pentyl, iso-amyl, hexyl, etc.

The alkoxy group may be a substituted or unsubstituted $C_1$-$C_{20}$ alkoxy group, and particular examples may include methoxy, ethoxy, propoxy, etc.

The alkylene oxide group may be a substituted or unsubstituted $C_2$-$C_{20}$ alkylene oxide group, and particular examples may include ethylene oxide, propylene oxide, butylene oxide, hexylene oxide, etc.

The alkylthio group may be a substituted or unsubstituted $C_1$-$C_{20}$ alkylthio group, and particular examples may include methylthio, ethylthio, etc.

The ether group may be a substituted or unsubstituted $C_1$-$C_{20}$ ether group, and particular examples may include dimethyl ether, ethyl methyl ether, diethyl ether, diphenyl ether, etc.

The ester group may be a substituted or unsubstituted $C_1$-$C_{20}$ ester group, and particular examples may include palmitoyl, etc.

The amine group may be a substituted or unsubstituted $C_1$-$C_{20}$ amine group, and particular examples may include methyl amine, ethyl amine, propyl amine, etc.

The ketone group may be a substituted or unsubstituted $C_1$-$C_{20}$ ketone group, and particular examples may include formyl, acetyl, propionyl, etc.

The epoxy group may be a substituted or unsubstituted $C_2$-$C_{20}$ epoxy group, and particular examples may include glycidyl, etc.

In the foregoing, "substituted" of the phrase "substituted or unsubstituted" denotes that substitution is performed with halogen atoms, a $C_1$-$C_{10}$ alkyl group substituted with halogen atoms (e.g., $CCF_3$, $CHCF_2$, $CH_2F$, $CCl_3$, etc.), a hydroxy group, a nitro group, a cyano group, an amino group, an amidino group, hydrazine, hydrazone, a carboxyl group or salts thereof, a sulfonic acid group or salts thereof, a phosphoric acid or salts thereof, a $C_1$-$C_{10}$ alkyl group, a $C_2$-$C_{10}$ alkenyl group, a $C_2$-$C_{10}$ alkynyl group, or a $C_1$-$C_{10}$ heteroalkyl group.

The additive composed of the purinone or the purinone derivative may be included in a range of about 0.005 wt % to about 5 wt % based on the total weight of the electrolyte, for example, in a range of about 0.05 wt % to about 0.1 wt %.

When the content of the additive is greater than about 5 wt %, the solid electrolyte interphase formed is too thick to be penetrated by lithium ions, and when the content of the additive is less than about 0.005 wt %, it is difficult to obtain the effect of the solid electrolyte interphase formation.

Since the electrolyte for a lithium secondary battery acts as a path for lithium ions, movement of lithium ions will not be smooth when the electrolyte is oxidized or reduced by reacting with electrode active materials during charging and discharging. As a result, battery charge and discharge performance deteriorates. The purinone or the purinone derivative in the electrolyte may form a stable solid electrolyte interphase by being oxidized on a cathode surface during the initial charge and discharge process of a lithium-ion battery. Although a mechanism by which the solid electrolyte interphase is formed has not been identified, it is estimated that the solid electrolyte interphase may be formed by a ring opening or polymerization reaction caused by the oxidation of the purinone or the purinone derivative. The solid electrolyte interphase formed on the cathode surface prevents direct contact between the electrolyte and the cathode active material so that the oxidation of the electrolyte on the cathode surface may be prevented. Therefore, the deterioration of the battery charge and discharge performance may be prevented. Only lithium ions are able to pass through the solid electrolyte interphase formed on the cathode surface at this time, and electrons are not transferred.

The thickness of the solid electrolyte interphase formed on the cathode surface may be in a range of about 0.05 nm to about 100 nm, for example, may be in a range of about 0.1 nm to about 80 nm, for example, may be in a range of about 0.5 nm to about 50 nm. By having the foregoing thickness range, the solid electrolyte interphase may not adversely affect the transfer of lithium ions and effectively prevents the oxidation of the electrolyte on the cathode surface.

Also, the purinone or the purinone derivative in the electrolyte for a lithium secondary battery are oxidized instead of the electrolyte by a radical material easily generated during charging and discharging at high temperatures and high voltages. Thus, the purinone or the purinone derivative may protect the electrolyte.

The nonaqueous organic solvent functions as a medium in which ions participating in electrochemical reactions of a battery may be transferred, and is not limited as long as it is generally used in the art. For example, a carbonate-based solvent, an ester-based solvent, an ether-based solvent, a ketone-based solvent, an alcohol-based solvent, an aprotic solvent, or a combination thereof may be used as the nonaqueous organic solvent.

More particularly, examples of the carbonate-based solvent may include dimethyl carbonate (DMC), diethyl carbonate (DEC), dipropyl carbonate (DPC), methylpropyl carbonate (MPC), ethylpropyl carbonate (EPC), ethylmethyl carbonate (methylethyl carbonate, EMC or MEC), ethylene carbonate (EC), propylene carbonate (PC), butylene carbonate (BC), etc.

Examples of the ester-based solvent may include methyl acetate, ethyl acetate, n-propyl acetate, tert-butyl acetate, methyl n-propionate (MP), ethyl n-propionate, γ-butyrolactone, 5-decanolide, γ-valerolactone, δ-valerolactone, dl-mevalonolactone, γ-caprolactone, ∈-caprolactone, etc.

Examples of the ether-based solvent may include dibutyl ether, tetraglyme, diglyme, dimethoxyethane, 2-methyltetrahydrofuran, tetrahydrofuran (THF), etc.

Examples of the ketone-based solvent may include cyclohexanone, etc.

Also, examples of the alcohol-based solvent may include ethyl alcohol, isopropyl alcohol, etc.

Examples of the aprotic solvent may include nitriles such as R—CN (where, R is a hydrocarbon group having a chain, branched, or cyclic structure with a carbon number of 2 to 20, and may include a double bond, an aromatic ring, or an ether bond); amides such as dimethylformamide; dioxolanes such as 1,3-dioxolane; or sulfolanes, etc.

The nonaqueous organic solvent may be used alone or by mixing two or more types of nonaqueous organic solvents, and when a mix of two or more nonaqueous organic solvents is used, the mixing ratio may be appropriately adjusted according to the designed battery performance, and this may be understood by those skilled in the art.

In cases of the carbonate-based solvent, the carbonate-based solvent may be obtained by mixing cyclic carbonate and linear carbonate in consideration of the dielectric constant and the viscosity. In this case, the cyclic carbonate and the linear carbonate may be mixed in a volume ratio of about 1:1 to about 1:9.

Also, the nonaqueous organic solvent may further include an aromatic hydrocarbon-based organic solvent in addition to the carbonate-based solvent. In this case, the carbonate-based solvent and the aromatic hydrocarbon-based organic solvent may be mixed in a volume ratio of about 1:1 to about 30:1.

An aromatic hydrocarbon-based compound of Chemical Formula 1 below may be used as the aromatic hydrocarbon-based organic solvent,

[Chemical Formula 1]

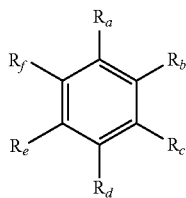

where $R_a$ to $R_f$ in the Chemical Formula 1 may be independently hydrogen, a halogen, an alkyl group with a carbon number of 1 to 10, a haloalkyl group, or a combination thereof.

More particularly, the aromatic hydrocarbon-based organic solvent may be benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,4,5-triiodotoluene, xylene, or a combination thereof.

Also, the lithium salt included in the electrolyte for a lithium secondary battery is a material capable of allowing the basic operation of the lithium secondary battery to be performed by dissolving in the organic solvent and acting as a supply source of lithium ions in the battery. The lithium salt of the electrolyte for the lithium secondary battery according to an embodiment may be any lithium salt that is generally used in a lithium battery. Examples of the lithium salt may be $LiPF_6$, $LiBF_4$, $LiSbF_6$, $LiAsF_6$, $LiCF_3SO_3$, $Li(CF_3SO_2)_3C$, $Li(CF_3SO_2)_2N$, $LiC_4F_9SO_3$, $LiClO_4$, $LiAlO_2$, $LiAlCl_4$, $LiBPh_4$, $LiN(C_xF_{2x+1}SO_2)(C_yF_{2y+1}SO_2)$ (where x and y are natural numbers), LiCl, LiI, lithium bis(oxalate)borate (LiBOB), and combinations thereof. The lithium salt may be used as a supporting electrolytic salt.

The concentration of the lithium salt may be in a range that is generally used in the art. The concentration thereof is not particularly limited. For example, the concentration of the lithium salt in the electrolyte may be in a range of about 0.1 M to about 2.0 M. By using the lithium salt in the foregoing concentration range, performance of the electrolyte may be improved by properly maintaining the concentration of the electrolyte, and mobility of lithium ions may be improved by properly maintaining a viscosity of the electrolyte.

Hereinafter, a lithium secondary battery employing the electrolyte according to an embodiment of the present invention will be described.

According to an embodiment of the present invention, a lithium secondary battery includes a cathode, an anode, and an electrolyte, wherein the electrolyte includes a lithium salt, a nonaqueous organic solvent, and an additive, and the additive includes one or more compounds including a purinone or a purinone derivative.

According to another embodiment of the present invention, a lithium secondary battery includes a cathode, an anode, and an electrolyte, wherein the electrolyte includes a lithium salt, a nonaqueous organic solvent, and an additive, the additive includes one or more compounds including a purinone or a purinone derivative, the cathode includes a solid electrolyte interphase formed on a surface thereof, and the solid electrolyte interphase is derived from a portion or all of the additive in the electrolyte.

Examples of the purinone may include xanthine, hypoxanthine, or uric acid. Examples of the purinone derivative may include 1,7-dimethylxanthine (paraxanthine), 3,7-dimethylxanthine (theobromine), caffeine, guanine, or isoguanine.

In the lithium secondary battery according to the present embodiment, the solid electrolyte interphase is formed on the cathode surface by oxidation of a portion or all of the additive included in the electrolyte during an initial charging of the battery. Therefore, the lithium secondary battery has excellent capacity retention characteristics even when the lithium secondary battery is charged at a high voltage of more than about 4.3 V, and also has excellent life and capacity retention characteristics even under a high-temperature condition.

The solid electrolyte interphase formed on the cathode surface of the lithium secondary battery according to the present embodiment may have a thickness in a range of about 0.05 nm to about 100 nm, for example, in a range of about 0.1 nm to 80 nm, for example, in a range of about 0.5 nm to 50 nm. By having the foregoing thickness range, the solid electrolyte interphase may not adversely affect transfer of lithium ions and effectively prevents the oxidation of the electrolyte on the cathode surface.

FIG. 1 is a cross-sectional view schematically illustrating a solid electrolyte interphase formed on a cathode surface of a lithium secondary battery according to an embodiment of the present invention. Referring to FIG. 1, it shows that a lithium ion 24 may be effectively transferred from the cathode to an electrolyte 28 by forming a thin and strong solid electrolyte interphase 26 on the surface of the cathode active material 22 on the cathode current collector 20.

Figure 2:
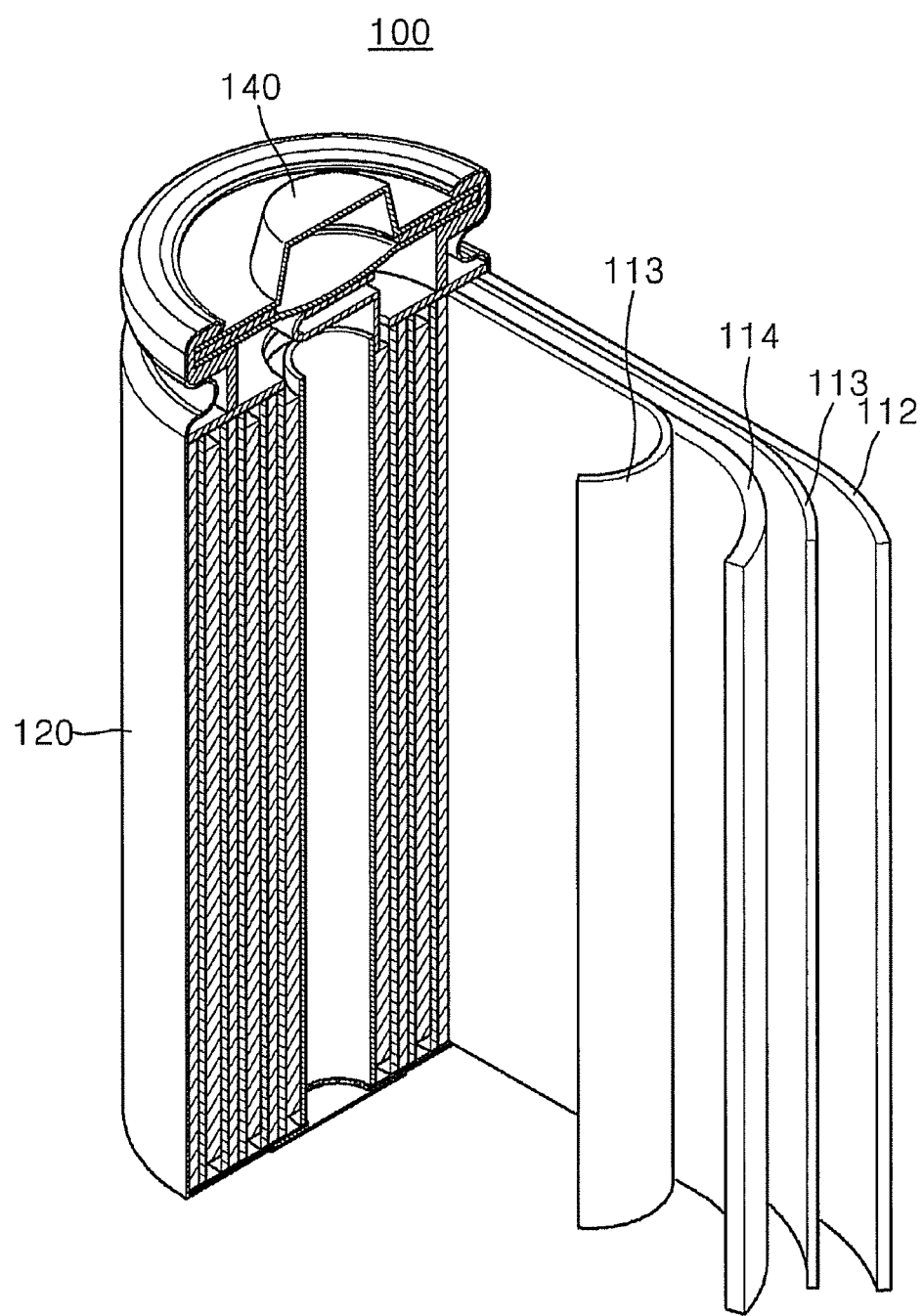
FIG. 2 is an exploded perspective view illustrating a lithium secondary battery according to an embodiment of the present invention.

FIG. 2 is an exploded perspective view illustrating a lithium secondary battery according to an embodiment of the present invention. FIG. 2 shows the structure of a cylindrical battery, but the lithium secondary battery according to the present embodiment is not limited thereto and may be a prismatic or pouch type.

The lithium secondary battery may be classified as a lithium-ion battery, a lithium-ion polymer battery, or a lithium polymer battery according to type of separator and electrolyte used; may be classified as a cylindrical, prismatic, coin, or pouch type according to its shape; and may be classified as a bulk type or a thin film type according to its size. The shape of the lithium secondary battery according to the present embodiment is not particularly limited, and since structures and manufacturing methods of batteries of the foregoing types are known in the art, detailed descriptions thereof will not be provided.

When described in more detail with reference to FIG. 2, lithium secondary battery 100 is a cylindrical type, and main portions of the lithium secondary battery 100 are composed of an anode 112, a cathode 114, a separator 113 disposed between the anode 112 and the cathode 114, an electrolyte (not shown) impregnated in the anode 112, the cathode 114, and the separator 113, a battery case 120, and an encapsulation member 140 encapsulating the battery case 120. The anode 112, the cathode 114, and the separator 113 are sequentially stacked, the stack is coiled into a spiral shape, and then the lithium secondary battery 100 is formed by putting the stack into the battery case 120.

The anode 112 includes a current collector and an anode active material layer formed on the current collector, and the anode active material layer includes an anode active material.

Materials for the current collector may include copper foil, nickel foil, stainless steel foil, titanium foil, nickel foam, copper foam, a polymer member coated with a conductive metal, or a combination thereof.

The anode active material is not particularly limited as long as it is generally used in the art. However, more particularly, the anode active material may include a lithium metal, a metallic material capable of alloying with lithium, a transition metal oxide, a material capable of doping and undoping lithium, or a material capable of reversibly inserting and extracting lithium ions.

Particular examples of the transition metal oxide include vanadium oxide, lithium vanadium oxide, etc. Examples of the material capable of doping and undoping lithium may include Si, $SiO_x$ ($0<x<2$), Si-T alloy (where T includes an alkali metal, an alkaline earth metal, a group 13 element, a group 14 element, a transition metal, a rare earth element, or a combination thereof, and does not include Si), Sn, $SnO_2$, Sn-Z (where Z includes an alkali metal, an alkaline earth metal, a group element, a group element, a transition metal, a rare earth element, or a combination thereof, and does not include Sn), etc. Also, the material capable of doping and undoping lithium may be used by mixing one of the foregoing examples and $SiO_2$. The elements T and Z may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

The material capable of reversibly inserting and extracting lithium ions may include a carbon material including any carbon-based anode active material generally used in a lithium ion secondary battery. Crystalline carbon, non-crystalline carbon, or a combination thereof may be typical examples of such carbon-based anode active materials. Examples of the crystalline carbon may include graphite such as amorphous, lamellar, flaky, spherical, or fibrous natural graphite or artificial graphite. Examples of the non-crystalline carbon may include soft carbon (low-temperature fired carbon), hard carbon, mesophase pitch carbide, fired cokes, etc.

The anode active material layer also includes a binder, and may selectively further include a conductive agent. The binder functions to adhere anode active material particles to each other well, and also functions to adhere the anode active material to the current collector well. Typical examples of the binder may include polyvinyl alcohol, carboxymethylcellulose, hydroxypropylcellulose, diacetylcellulose, polyvinyl chloride, carboxylic polyvinyl chloride, polyvinyl fluoride, a polymer including ethylene oxide, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, etc. However, the binder is not limited thereto.

The conductive agent is used to provide conductivity to the electrode and any material may be used as long as it is an electrically conductive material that does not cause any chemical change in the battery. Examples of the conductive agent may include natural graphite, artificial graphite, carbon black, acetylene black, carbon fibers, metal powders such as copper, nickel, aluminum, and silver, metal fibers, etc. Also, the conductive agent may be used by mixing conductive materials such as polyphenylene derivatives.

The cathode 114 includes a current collector and a cathode active material formed on the current collector. Aluminum (Al) may be used as the current collector, but the current collector is not limited thereto.

The cathode active material is not particularly limited as long as it is generally used in the art. However, more particularly, a compound capable of reversibly inserting and extracting lithium may be used as the cathode active material. Particularly, one or more complex oxides formed of cobalt, manganese, nickel, iron, or a combination thereof and lithium may be used as the cathode active material. Particular examples thereof may include $LiCoO_2$, $LiNi_{1-x}Co_xO_2$ ($0\leq x<1$), $Li_{1-x}M_xO_2$ (where M is Mn or Fe, $0.03<x<0.1$), $Li[Ni_xCo_{1-2x}Mn_x]O_2$ ($0<x<0.5$), $Li[Ni_xMn_x]O_2$ ($0<x\leq0.5$), $Li_{1+x}(Ni,Co,Mn)_{1-y}O_z$ ($0<x\leq1$, $0\leq y<1$, $2\leq z\leq4$), $LiM_2O_4$ (where M is Ti, V, or Mn), $LiM_xMn_{2-x}O_4$ (where M is a transition metal, $0<x<1$), $LiFePO_4$, $LiMPO_4$ (where M is Mn, Co, or Ni), etc. Also, vanadium oxides and derivatives thereof may be used as the cathode active material. Particular examples thereof may include $V_2O_5$, $V_2O_3$, $VO_2(B)$, $V_6O_{13}$, $V_4O_9$, $V_3O_7$, $Ag_2V_4O_{11}$, $AgVO_3$, $LiV_3O_5$, $\delta$-$Mn_xV_2O_5$, $\delta$-$NH_4V_4O_{10}$, $Mn_{0.8}V_7O_{16}$, $LiV_3O_8$, $Cu_xV_2O_5$, $Cr_xV_6O_{13}$, etc. In addition, compounds such as $M_2(XO_4)_3$ (where M is a transition metal, and X is S, P, As, Mo, or W), $Li_3M_2(PO_4)_3$ (where M is Fe, V, or Ti), or $Li_2MSiO_4$ (where M is Fe or Mn) may be used as the cathode active material.

Typical examples of the cathode active material may include $LiMn_2O_4$, $LiNi_2O_4$, $LiCoO_2$, $LiNiO_2$, $LiMnO_2$, $Li_2MnO_3$, $LiFePO_4$, $Li_{1+x}(Ni,Co,Mn)_{1-x}O_2$ ($0.05<x\leq0.2$), $LiNi_{0.5}Mn_{1.5}O_4$, etc.

A compound having any of the foregoing compounds and a coating layer coated on a surface of the foregoing compound may also be used as the cathode active material, and the cathode active material may also be used by mixing any of the foregoing compounds and the compound having the coating layer. The coating layer may include a coating element compound such as an oxide or a hydroxide of a coating element, an oxyhydroxide of a coating element, an oxycarbonate of a coating element, a hydroxycarbonate of a coating element, etc. The compound constituting the coating layer may be non-crystalline or crystalline. The coating element included in the coating layer may be Mg, Al, Co, K, Na, Ca, Si, Ti, V, Sn, Ge, Ga, B, As, Zr, or a combination thereof. Any coating method may be used to form the coating layer as long as it is capable of not adversely affecting properties of matter of the cathode active material (e.g., spray coating, a dipping method, etc.). Since such a coating method is readily understood by those skilled in the art, detailed descriptions thereof will not be provided.

The operating voltage of the cathode active material may be in a range of about 4.0 V to about 5.5 V. For example, the cathode active material may include an oleyl oleate (OLO) cathode active material and a 5 V-class cathode active material having a spinel structure to be usable in the foregoing operating range.

The cathode active material layer may also include a binder and a conductive agent. The binder functions to adhere cathode active material particles to each other well, and also functions to adhere the cathode active material to the current collector well. Typical examples of the binder may include polyvinyl alcohol, carboxymethylcellulose, hydroxypropylcellulose, diacetylcellulose, polyvinyl chloride, carboxylic polyvinyl chloride, polyvinyl fluoride, a polymer including ethylene oxide, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, etc. However, the binder is not limited thereto.

The conductive agent is used to provide conductivity to the electrode and any material may be used as long as it is an electrically conductive material that does not cause any chemical change in the battery. Examples of the conductive agent may include natural graphite, artificial graphite, carbon black, acetylene black, carbon fibers, metal powders such as copper, nickel, aluminum, and silver, metal fibers, etc. Also, the conductive agent may be used by mixing one or more conductive materials such as polyphenylene derivatives.

Concentrations of the cathode active material, the binder, and the conductive agent may be used at levels at which they are generally used in a lithium battery. For example, the weight ratio between the cathode active material and a mixture of the conductive agent and the binder may be in a range of about 98:2 to about 92:8, and the mixing ratio between the conductive agent and the binder may be in a range of about 1:1.5 to about 1:3, but they are not limited thereto.

An active material composition is prepared for each of the anode 112 and the cathode 114 by mixing an active material, a conductive agent, and a binder in a solvent, and then the anode 112 and the cathode 114 are fabricated by coating the compositions on the current collectors. Since the foregoing method of fabricating the electrodes is widely known in the art, detailed descriptions thereof will not be provided in the present invention. N-methylpyrrolidone may be used as the solvent, but the solvent is not limited thereto.

The separator 113 may exist between ache cathode 114 and the anode 112 according to types of the lithium secondary battery 100. Polyethylene, polypropylene, polyvinylidene fluoride, or a multilayer thereof having two or more layers may be used as the separator 113. Also, a mixed multilayer such as a double-layered separator of polyethylene/polypropylene or a triple-layered separator of polyethylene/polypropylene/polyethylene or polypropylene/polyethylene/polypropylene may be used as the separator 113.

Hereinafter, exemplary embodiments of the present invention will be described. However, the embodiments described below are provided only for illustration and do not limit the present invention. Also, since any details not described herein may be technically easily inferred by those skilled in the art, descriptions thereof will not be provided.

Example 1

Preparation of Electrolyte for Lithium Secondary Battery

A homogenous electrolyte for a lithium secondary battery was prepared by adding about 0.05 wt % of xanthine as an additive into a mixed organic solvent containing about 30 vol % of ethylene carbonate (EC), about 50 vol % of diethyl carbonate (DEC), and about 20 vol % of ethylmethyl carbonate (EMC), and using about 1.3 M $LiPF_6$ as a lithium salt.

Example 2

Preparation of Electrolyte for Lithium Secondary Battery

Except for using about 0.05 wt % of hypoxanthine instead of xanthine as an additive, an electrolyte for a lithium secondary battery was prepared by using the method of Example 1.

Example 3

Preparation of Electrolyte for Lithium Secondary Battery

Except for using about 0.1 wt % of 1,7-dimethylxanthine instead of xanthine as an additive, an electrolyte for a lithium secondary battery was prepared by using the method of Example 1.

Example 4

Preparation of Electrolyte for Lithium Secondary Battery

Except for using about 0.1 wt % of caffeine instead of xanthine as an additive, an electrolyte for a lithium secondary battery was prepared by using the method of Example 1.

Example 5

Preparation of Electrolyte for Lithium Secondary Battery

Except for using about 0.05 wt % of uric acid instead of xanthine as an additive, an electrolyte for a lithium secondary battery was prepared by using the method of Example 1.

Comparative Example 1

Preparation of Electrolyte for Lithium Secondary Battery

An electrolyte for a lithium secondary battery was prepared without an additive by using about 1.3 M $LiPF_6$ as a lithium salt and a mixed organic solvent containing about 30 vol % of ethylene carbonate (EC), about 50 vol % of diethyl carbonate (DEC), and about 20 vol % of ethylmethyl carbonate (EMC).

Comparative Example 2

Preparation of Electrolyte for Lithium Secondary Battery

Except for using about 0.05 wt % of purine instead of xanthine as an additive, an electrolyte for a lithium secondary battery was prepared by using the method of Example 1.

Example 6

Fabrication of Lithium Secondary Battery

A slurry was prepared by mixing $Li_{1-x}(Ni,Co,Mn)_{1-x}O_2$ (0.05<x≤0.2) powder as a cathode active material, a binder in which about 5 wt % of polyvinylidene fluoride (PVdF) is dissolved in N-methylpyrrolidone (NMP), and a conductive agent (acetylene black) at a weight ratio of about 92:4:4. The slurry was coated on an aluminum foil of a thickness of about 15 μm to form an electrode. The aluminum foil coated with the slurry was put into an oven at about 90° C. and dried for a first time for about 2 hours, and then, dried for a second time in a vacuum oven at about 120° C. for about 2 hours in order to completely evaporate the NMP. The electrode was subjected to rolling and punched to obtain a cathode for a coin cell having a diameter of about 1.5 cm and a thickness of about 50-60 μm. The capacity of the cathode was about 1.7 mAh/cm².

A standard coin cell was fabricated by using the cathode, a graphite anode, a polyethylene separator, and the electrolyte for a lithium secondary battery obtained in Example 1.

Example 7

Fabrication of Lithium Secondary Battery

Except for using the electrolyte prepared in Example 2 as an electrolyte, a lithium secondary battery was fabricated by using the method of Example 6.

Example 8

Fabrication of Lithium Secondary Battery

Except for using the electrolyte prepared in Example 3 as an electrolyte, a lithium secondary battery was fabricated by using the method of Example 6.

Example 9

Fabrication of Lithium Secondary Battery

Except for using the electrolyte prepared in Example 4 as an electrolyte, a lithium secondary battery was fabricated by using the method of Example 6.

Example 10

Fabrication of Lithium Secondary Battery

Except for using the electrolyte prepared in Example 5 as an electrolyte, a lithium secondary battery was fabricated by using the method of Example 6.

Comparative Example 3

Fabrication of Lithium Secondary Battery

Except for using the electrolyte prepared in Comparative Example 1 as an electrolyte, a lithium secondary battery was fabricated by using the method of Example 6.

Comparative Example 4

Fabrication of Lithium Secondary Battery

Except for using the electrolyte prepared in Comparative Example 2 as an electrolyte, a lithium secondary battery was fabricated by using the method of Example 6.

Example 11

Fabrication of Lithium Secondary Battery

A standard coin cell was fabricated by using the cathode, a lithium metal anode, a polyethylene separator of Example 6, and the electrolyte for a lithium secondary battery obtained in Example 1.

Example 12

Fabrication of Lithium Secondary Battery

Except for using the electrolyte prepared in Example 2 as an electrolyte, a lithium secondary battery was fabricated by using the method of Example 11.

Example 13

Fabrication of Lithium Secondary Battery

Except for using the electrolyte prepared in Example 3 as an electrolyte, a lithium secondary battery was fabricated by using the method of Example 11.

Example 14

Fabrication of Lithium Secondary Battery

Except for using the electrolyte prepared in Example 4 as an electrolyte, a lithium secondary battery was fabricated by using the method of Example 11.

Example 15

Fabrication of Lithium Secondary Battery

Except for using the electrolyte prepared in Example 5 as an electrolyte, a lithium secondary battery was fabricated by using the method of Example 11.

Comparative Example 5

Fabrication of Lithium Secondary Battery

Except for using the electrolyte prepared in Comparative Example 1 as an electrolyte, a lithium secondary battery was fabricated by using the method of Example 11.

Comparative Example 6

Fabrication of Lithium Secondary Battery

Except for using the electrolyte prepared in Comparative Example 2 as an electrolyte, a lithium secondary battery was fabricated by using the same method as Example 11.

Experimental Example

Charge/Discharge Characteristic Test of Lithium Secondary Battery

Charge and discharge tests for measuring formation charge and discharge, standard charge and discharge, a life characteristic, and a high-temperature storage characteristic as described below were performed on the coin cells fabricated in Examples 6 to 10 and Comparative Examples 3 and 4.

Formation Charge and Discharge

Formation charge and discharge was performed twice at room temperature on the coin cells fabricated in Examples 6 to 15 and Comparative Examples 3 to 6.

In a first formation operation, constant-current charge was performed on the coin cells at about 0.2 C until the voltage reached about 4.4 V, and thereafter, constant-voltage charge was performed until the current reached about 0.05 C. Subsequently, constant-current discharge was performed at about 0.2 C until the voltage reached about 2.8 V. A second formation operation was performed in a manner identical to the first formation operation.

1 C charge denotes that charge is performed to allow a capacity (mAh) of a cell to be reached by charging for about 1 hour. Likewise, a 1 C discharge denotes that discharge is performed to allow all the capacity (mAh) of the cell to be consumed by discharging for about 1 hour.

Standard Charge and Discharge

Charge was performed at about 0.5 C on the coin cells of Examples 6 to 15 and Comparative Examples 3 to 6, after having undergone the foregoing formation charge and discharge, until the voltage reached about 4.4 V, and then discharge was performed at about 0.2 C until the voltage reached about 2.8 V. The charge and discharge condition at this time was referred to as a standard charge and discharge condition, and the discharge capacity at this time was referred to as a standard capacity. The standard capacity thus measured was about 3.2-3.5 mAh.

Life Characteristic: Cycle Capacity Retention Ratio (%)

1 C charge was performed on the lithium secondary batteries of Examples 6 to 15 and Comparative Examples 3 and 4 in a constant temperature chamber at about 45° C. until the voltage reached about 4.4 V, and then 1 C discharge was performed until the voltage reached about 2.8 V. The discharge capacity (discharge capacity of the 1$^{st}$ cycle) at this time was measured. The discharge capacity in each cycle was measured while the 1 C charge and the 1 C discharge were repeated in the chamber at about 45° C. The charge and the discharge was performed a total of about 200 times. The cycle capacity retention ratio was calculated from the discharge capacity measured in each cycle. The discharge capacity of each cycle was obtained according to Equation 1 below.

Cycle capacity retention ratio(%)=100×(discharge capacity in the nth cycle/discharge capacity in the 1$^{st}$ cycle)   [Equation 1]

Figure 3:
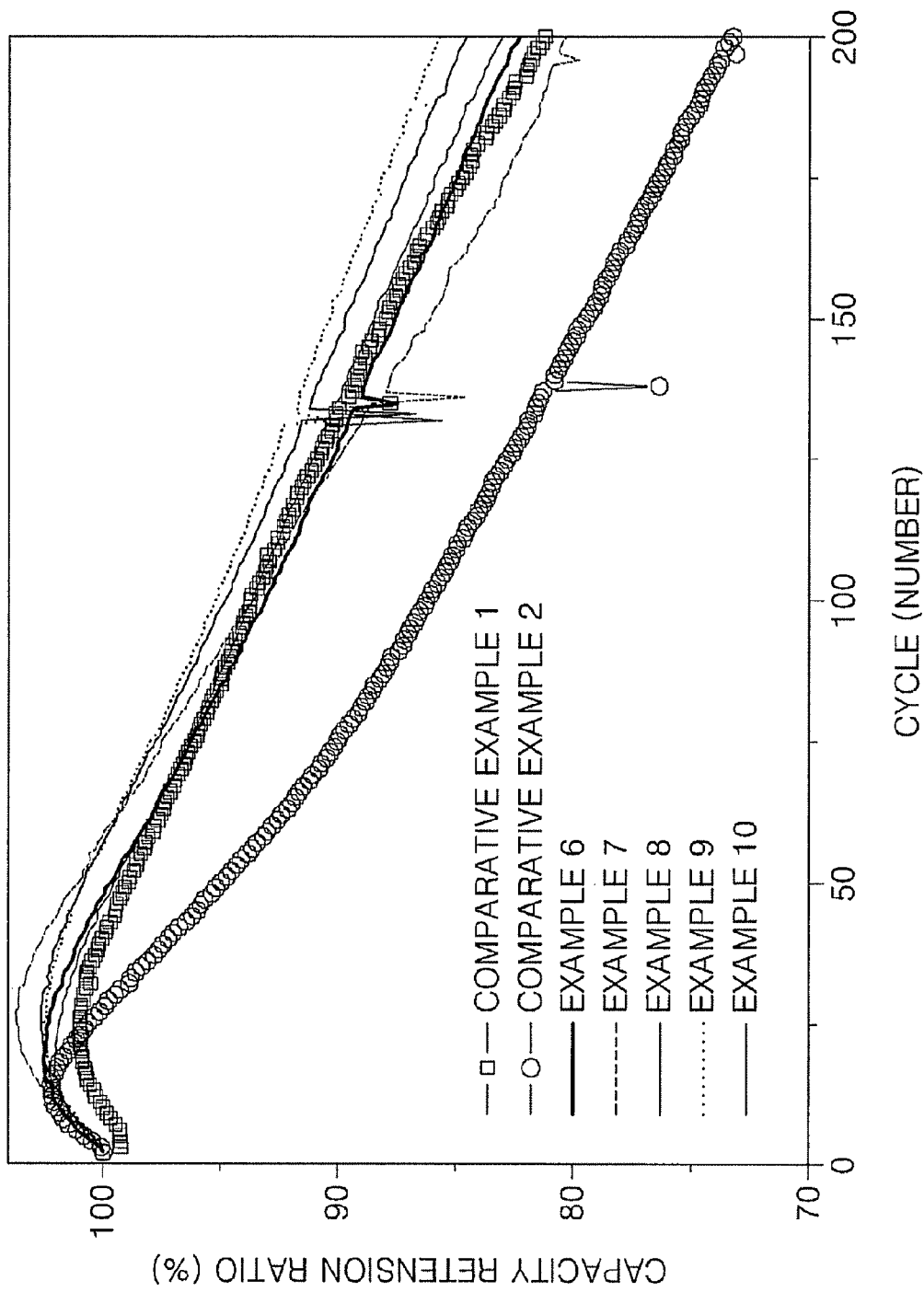
FIG. 3 is a graph showing cycle capacity retention ratios of Examples 6 to 10 and Comparative Examples 3 and 4.

FIG. 3 is a graph showing cycle capacity retention ratios obtained by using the foregoing method. Table 1 presents values of the capacity retention ratios after charging and discharging about 200 times. Referring to the graph of FIG. 3 and Table 1, the cycle capacity retention ratio with respect to Example 9 using caffeine as the additive was the best. After Example 9, Example 8 using 1,7-dimethylxanthine as the additive exhibited the next highest capacity retention ratio. After Example 8, Example 10 using uric acid as the additive exhibited the next highest capacity retention ratio. After Example 10, capacity retention ratios decreased in the sequence of Example 6 using xanthine as the additive, Comparative Example 3 without using an additive, and Example 7 using hypoxanthine as the additive. The capacity retention ratio of Comparative Example 7 using purine as the additive was the lowest, and large differences between the capacity retention ratios of Examples 6 to 10 and Comparative Example 3 are shown. A high capacity retention ratio was maintained up to about 60 cycles with respect to Example 7 using hypoxanthine. However, the capacity retention ratio thereafter gradually dropped lower and eventually Example 7, except for the Comparative Example 4 having purine, had the lowest recorded capacity retention ratio.

TABLE 1

| Example | Concentration | Capacity retention ratio(%) after 200 cycles |
|---|---|---|
| Example 6 (Xanthine) | 0.05 | 82.4 |
| Example 7 (Hypoxanthine) | 0.05 | 80.3 |
| Example 8 (1,7-dimethylxanthine) | 0.1 | 84.6 |
| Example 9 (Caffeine) | 0.1 | 85.7 |
| Example 10 (Uric acid) | 0.05 | 83.1 |
| Comparative Example 3 | 0 | 81.2 |
| Comparative Example 4 (Purine) | 0.05 | 73.2 |

Since the capacity retention ratios are high when caffeine or 1,7-dimethylxanthine was used as the additive, it is considered that a solid electrolyte interphase is more easily formed on a surface of a cathode active material as the numbers of methyl groups substituted in xanthine are higher. Meanwhile, since the cycle capacity retention ratios drop in the sequence of uric acid, xanthine, hypoxanthine, and purine, it is considered that a solid electrolyte interphase is more easily formed on a surface of a cathode active material as the number of ketone groups substituted for purine are higher.

High-Temperature Storage Characteristic I: High-Temperature Capacity Retention Ratio (%)

The lithium secondary batteries of Example 11 to 15 and Comparative Examples 5 and 6, on which formation charge and discharge were performed twice and standard charge and discharge was performed once, were charged under the standard charge condition, i.e., at 0.5 C, and then were left standing at a temperature of about 90° C. for about 20 hours. Thereafter, discharge capacities thereof (discharge capacities after high-temperature storage) were measured, and high-temperature capacity retention ratios were calculated therefrom. Also, open-circuit voltages were measured before and after the high-temperature storage.

The high-temperature capacity retention ratio was obtained according to Equation 2 below.

High-temperature capacity retention ratio(%)=100× (discharge capacity after high-temperature storage/standard discharge capacity)   [Equation 2]

Figure 4:
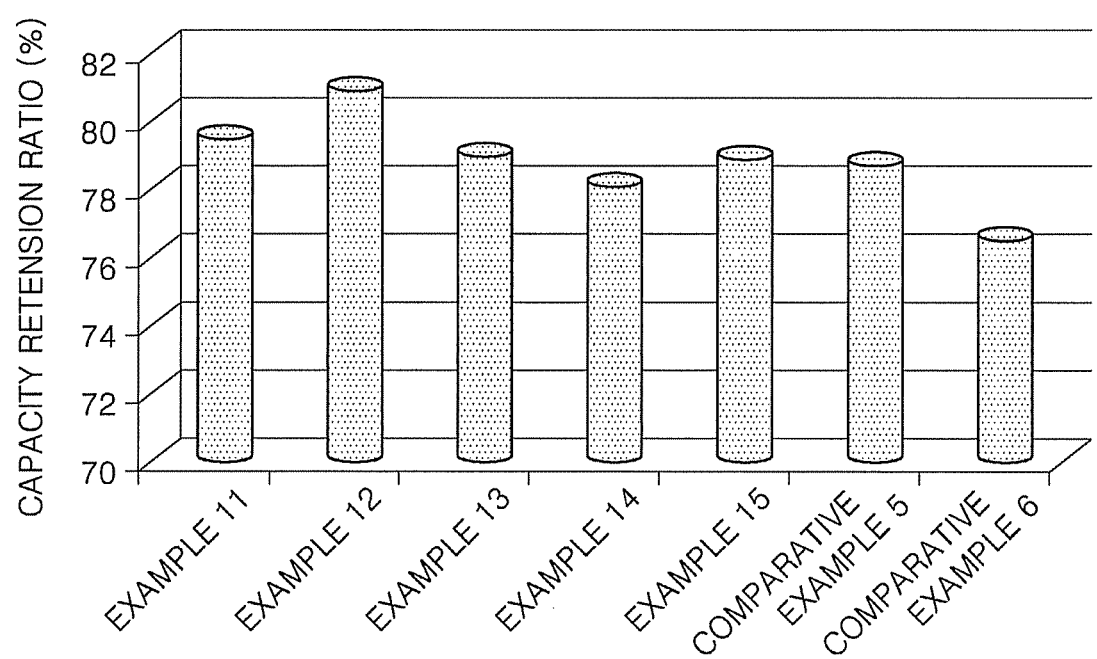
FIG. 4 is a graph showing high-temperature capacity retention ratios of Examples 11 to 15 and Comparative Examples 5 and 6.

Table 2 shows high-temperature capacity retention ratios obtained by using the foregoing method, and FIG. 4 is a graph showing high-temperature capacity retention ratios of Table 2.

TABLE 2

| Section | Example 11 | Example 12 | Example 13 | Example 14 | Example 15 | Comparative Example 5 | Comparative Example 6 |
|---|---|---|---|---|---|---|---|
| Standard discharge capacity (mAh) | 2.48 | 2.61 | 2.23 | 2.56 | 2.40 | 2.64 | 2.55 |
| Discharge capacity after high-temperature storage (mAh) | 1.97 | 2.11 | 1.76 | 2.00 | 1.90 | 2.08 | 1.95 |
| High-temperature capacity retention ratio (%) | 79.5 | 80.9 | 79.0 | 78.1 | 78.9 | 78.7 | 76.5 |

Referring to Table 2 and FIG. 4, the high-temperature capacity retention ratios decrease in the sequence of Example 12, Example 11, Example 13, Example 15, Comparative Example 5, Example 14, and Comparative Example 6. That is, the high-temperature capacity retention ratios decrease in the sequence of using hypoxanthine, xanthine, 1,7-dimethylxanthine, and uric acid as an additive, no additive, and using caffeine and purine as the additives.

Figure 5:
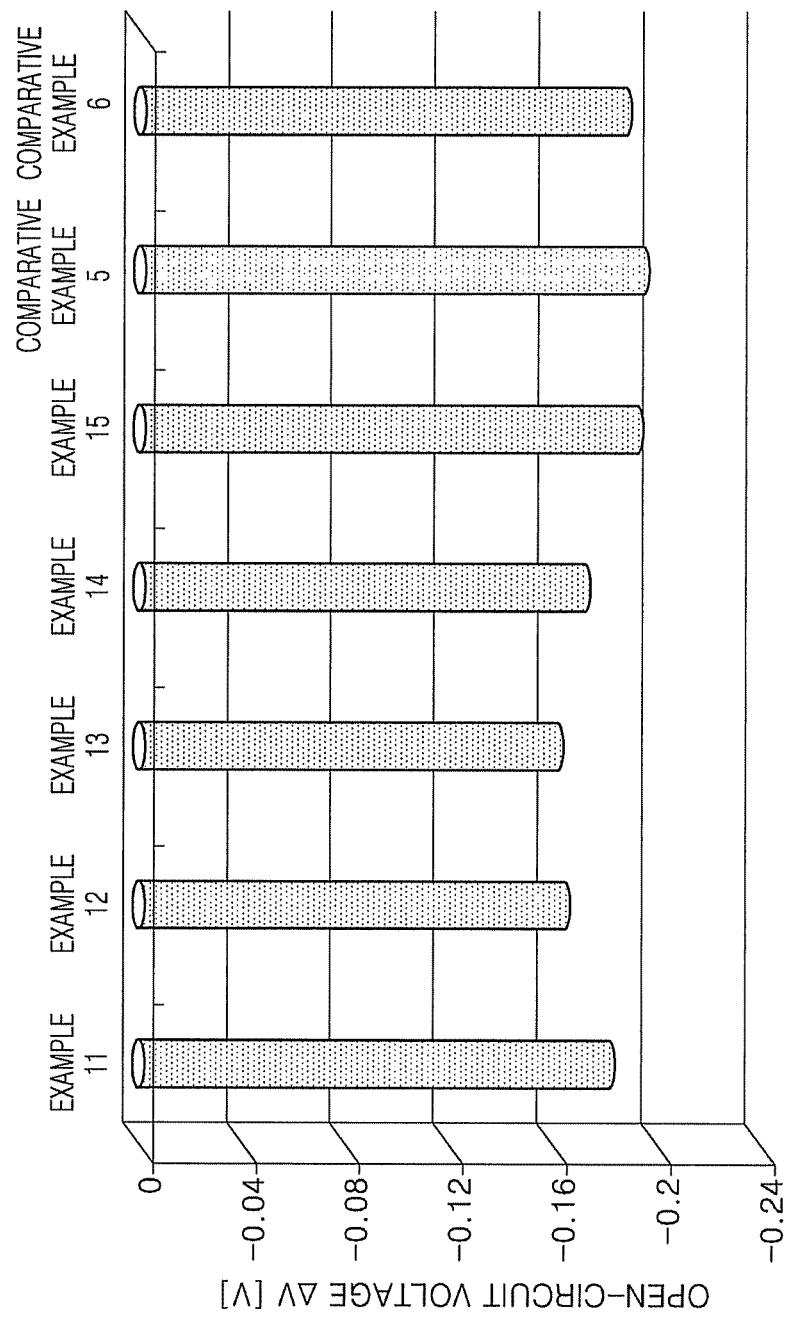
FIG. 5 is a graph showing open-circuit voltages of Examples 11 to 15 and Comparative Examples 5 and 6.

Table 3 shows open-circuit voltages (OCV) before and after high-temperature storage, and FIG. 5 is a graph showing the open-circuit voltages of Table 3.

TABLE 3

| Section | Example 11 | Example 12 | Example 13 | Example 14 | Example 15 | Comparative Example 5 | Comparative Example 6 |
|---|---|---|---|---|---|---|---|
| OCV (V) before high-temperature storage | 4.2803 | 4.2830 | 4.2445 | 4.2355 | 4.2755 | 4.2849 | 4.2713 |
| OCV (V) after high-temperature storage | 4.0983 | 4.1178 | 4.0830 | 4.0636 | 4.0837 | 4.0895 | 4.0829 |
| ΔV (V) | −0.182 | −0.165 | −0.162 | −0.172 | −0.192 | −0.195 | −0.188 |

Referring to Table 3 and FIG. 5, changes of the open-circuit voltages increase in the sequence of Example 13, Example 12, Example 14, Example 11, Comparative Example 6, Example 15, and Comparative Example 5. That is, in most cases of using the additive, decreases in the open-circuit voltage during the high-temperature storage are smaller than those of the Comparative Examples. From the results of Table 3 and FIG. 5, it may be confirmed that the OCV characteristics of the lithium secondary batteries according to the embodiments are also improved after the high-temperature storage.

In the lithium secondary batteries according to the embodiments of the present invention, since solid electrolyte interphases are formed on surfaces of cathode active materials of the batteries from additives of electrolytes during the initiative charge and discharge, direct contact between the electrolytes and the cathode active materials may be prevented. Although lithium ions pass through the solid electrolyte interphases, electrons do not pass through the solid electrolyte interphases. Therefore, oxidation of an electrolyte by losing electrons to a cathode at high temperatures and high voltages may be prevented. Also, decomposition of an electrolyte due to decomposition of an additive in high temperature and high voltage environments may be prevented. Therefore, since loss of an electrolyte at high temperatures and high voltages is prevented, long life may be obtained by maintaining high capacity and efficiency of a lithium secondary battery.

The improvements in lives and high-temperature storage of the lithium secondary batteries according to the embodiments of the present invention make them usable in extreme environments when they are applied to electric vehicles, and make them appropriate for a power storage application where there is a high probability of high temperature exposure. Also, since it is expected that the foregoing improvements may be applied in the future to batteries including a cathode active material, e.g., a 5 V-class spinel high voltage phosphate cathode active material, subjected to higher voltages, they will play a role in improving energy densities of batteries for an electric vehicle and a power storage.

Since an additive containing a purinone or a purinone derivative which is capable of forming a solid electrolyte interphase on a cathode surface of a lithium secondary battery and being oxidized instead of an electrolyte, is included in the electrolyte, life and high-temperature storage characteristics of the lithium secondary battery may be improved.

While the present invention has been particularly shown and described with reference to exemplary embodiments thereof, it will be understood by those of ordinary skill in the art that various changes in form and details may be made therein without departing from the spirit and scope of the present invention as defined by the following claims.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An electrolyte for a lithium secondary battery comprising:
    a lithium salt;
    a nonaqueous organic solvent; and
    an additive containing one or more compounds selected from a hypoxanthine or a hypoxanthine derivative.

2. The electrolyte for a lithium secondary battery of claim 1, wherein the hypoxanthine derivative has one or more substituents of an alkyl group, an alkoxy group, an alkylene oxide group, an alkylthio group, an ether group, an ester group, a hydroxy group, an amine group, a thiol group, a ketone group, an epoxy group, a fluoro group, a chloro group, or a bromo group.

3. The electrolyte for a lithium secondary battery of claim 1, wherein the hypoxanthine or the hypoxanthine derivative comprises hypoxanthine, guanine, or isoguanine.

4. The electrolyte for a lithium secondary battery of claim 1, wherein the amount of the additive is included in a range of about 0.005 wt % to about 5 wt % based on the total weight of the electrolyte.

5. The electrolyte for a lithium secondary battery of claim 1, wherein the lithium salt comprises $LiPF_6$, $LiBF_4$, $LiSbF_6$, $LiAsF_6$, $LiCF_3SO_3$, $Li(CF_3SO_2)_3C$, $Li(CF_3SO_2)_2N$, $LiC_4F_9SO_3$, $LiClO_4$, $LiAlO_4$, $LiAlCl_4$, $LiBPh_4$, $LiN(C_xF_{2x+1}SO_2)(C_yF_{2y+1}SO_2)$ (where x and y are natural numbers), LiCl, LiI, lithium bis(oxalate)borate (LiBOB), or a combination thereof.

6. The electrolyte for a lithium secondary battery of claim 1, wherein the nonaqueous organic solvent comprises a carbonate-based solvent, an ester-based solvent, an ether-based solvent, a ketone-based solvent, an alcohol-based solvent, an aprotic solvent, or a combination thereof.

7. A lithium secondary battery comprising:
    a cathode having a cathode active material capable of inserting and extracting lithium;
    an anode having an anode active material capable of inserting and extracting lithium; and
    an electrolyte filling between the cathode and the anode, wherein the electrolyte includes a lithium salt, a nonaqueous organic solvent, and an additive containing one or more compounds comprising a hypoxanthine or a hypoxanthine derivative.

8. The lithium secondary battery of claim 7, wherein the cathode comprises a solid electrolyte interphase formed on a surface thereof, and the solid electrolyte interphase is derived from a portion or all of the additive in the electrolyte.

9. The lithium secondary battery of claim 8, wherein the thickness of the solid electrolyte interphase is in a range of about 0.05 nm to about 100 nm.

10. The lithium secondary battery of claim 7, wherein the cathode active material comprises $LiCoO_2$, $LiNi_{1-x}Co_xO_2$ ($0 \leq x \leq 1$), $Li_{1-x}M_xO_2$ (where M is Mn or Fe, $0.03 < x < 0.1$), $Li[Ni_xCo_{1-2x}Mn_x]O_2$ ($0 < x < 0.5$), $Li[Ni_xMn_x]O_2$ ($0 < x \leq 0.5$), $Li_{1+x}(Ni,Co,Mn)_{1-y}O_z$ ($0 < x \leq 1$, $0 \leq y < 1$, $2 \leq z \leq 4$), $LiM_2O_4$ (where, M is Ti, V, or Mn), $LiM_xMn_{2-x}O_4$ (where M is a transition metal, $0 < x < 1$), $LiFePO_4$, $LiMPO_4$ (where M is Mn, Co, or Ni), $V_2O_5$, $V_2O_3$, $VO_2(B)$, $V_6O_{13}$, $V_4O_9$, $V_3O_7$, $Ag_2V_4O_{11}$, $AgVO_3$, $LiV_3O_5$, $\delta$-$Mn_yV_2O_5$, $\delta$-$NH_4V_4O_{10}$, $Mn_{0.8}V_7O_{16}$, $LiV_3O_8$, $Cu_xV_2O_5$, $Cr_xV_6O_{13}$, $M_2(XO_4)_3$ (where M is a transition metal, and X is S, P, As, Mo, or W), or $Li_3M_2(PO_4)_3$ (where, M is Fe, V, or Ti).

11. The lithium secondary battery of claim 10, wherein the operating voltage of the cathode active material is in a range of about 4.0 V to about 5.5 V.

12. The lithium secondary battery of claim 7, wherein the cathode active material comprises $Li_{1+x}(Ni,Co,Mn)_{1-x}O_2$ ($0.05 < x \leq 0.2$), or $LiNi_{0.5}Mn_{1.5}O_4$.

13. The lithium secondary battery of claim 7, wherein the anode active material comprises vanadium oxide, lithium vanadium oxide, Si, $SiO_x$ ($0 < x < 2$), Si-T alloy (where, the T includes Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof), graphite, soft carbon, hard carbon, mesophase pitch carbide, or fired cokes.

14. The lithium secondary battery of claim 7, wherein the hypoxanthine derivative have one or more substituents of an alkyl group, an alkoxy group, an alkylene oxide group, an alkylthio group, an ether group, an ester group, a hydroxy group, an amine group, a thiol group, a ketone group, an epoxy group, a fluoro group, a chloro group, or a bromo group.

15. The lithium secondary battery of claim 7, wherein the hypoxanthine or the hypoxanthine derivative comprises hypoxanthine, guanine, or isoguanine.

16. The lithium secondary battery of claim 7, wherein the amount of the additive is included in a range of about 0.005 wt % to about 5 wt % based on the total weight of the electrolyte.

17. The lithium secondary battery of claim 7, wherein the lithium salt comprises $LiPF_6$, $LiBF_4$, $LiSbF_6$, $LiAsF_6$, $LiCF_3SO_3$, $Li(CF_3SO_2)_3C$, $Li(CF_3SO_2)_2N$, $LiC_4F_9SO_3$, $LiClO_4$, $LiAlO_4$, $LiAlCl_4$, $LiBPh_4$, $LiN(C_xF_{2x+1}SO_2)(C_xF_{2y+1}SO_2)$ (where x and y are natural numbers), LiCl, LiI, lithium bis(oxalate)borate (LiBOB), or a combination thereof.

18. The lithium secondary battery of claim 7, wherein the nonaqueous organic solvent comprises a carbonate-based solvent, an ester-based solvent, an ether-based solvent, a ketone-based solvent, an alcohol-based solvent, an aprotic solvent, or a combination thereof.

19. The lithium secondary battery of claim 7, further comprising a separator disposed between the cathode and the anode to electrically insulate the cathode and the anode.

\* \* \* \* \*